May 19, 1942.　　　A. L. BERGER　　　2,283,175
POWER REGULATOR FOR SUPERCHARGED ENGINES
Filed May 13, 1940　　　2 Sheets-Sheet 1
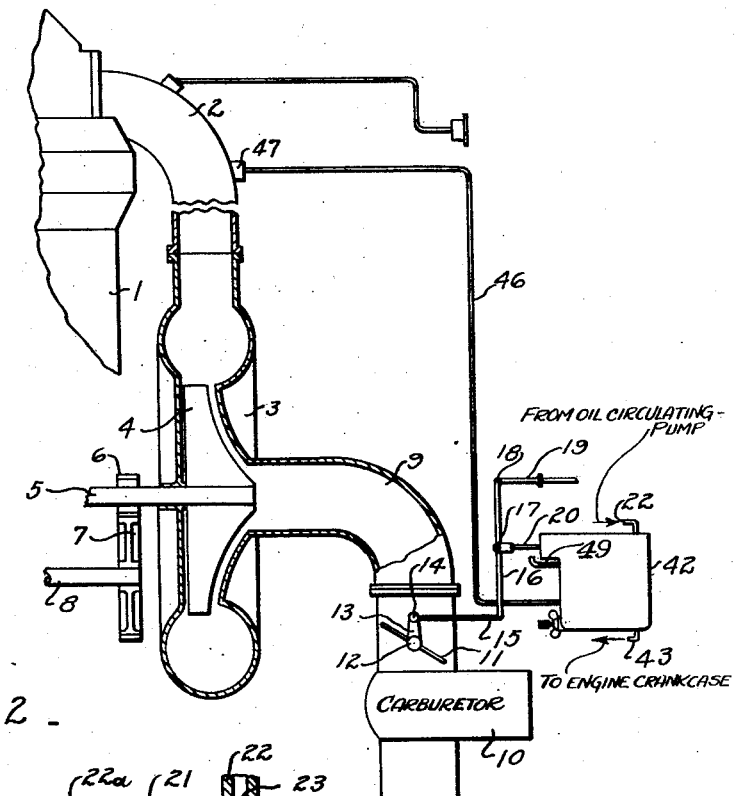
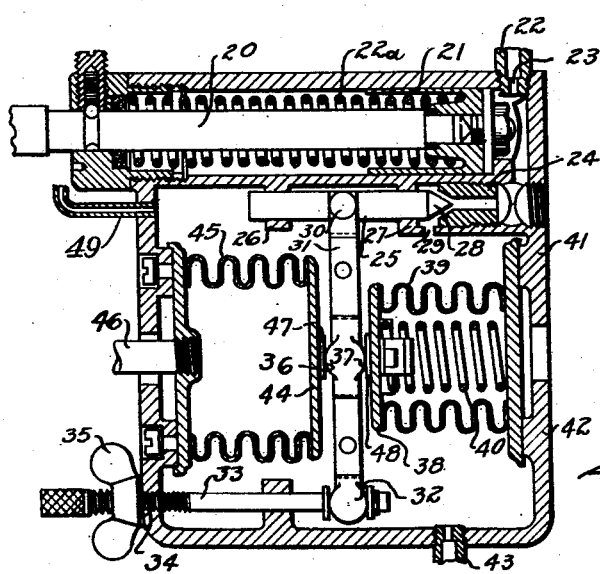
INVENTOR
ADOLPH L. BERGER

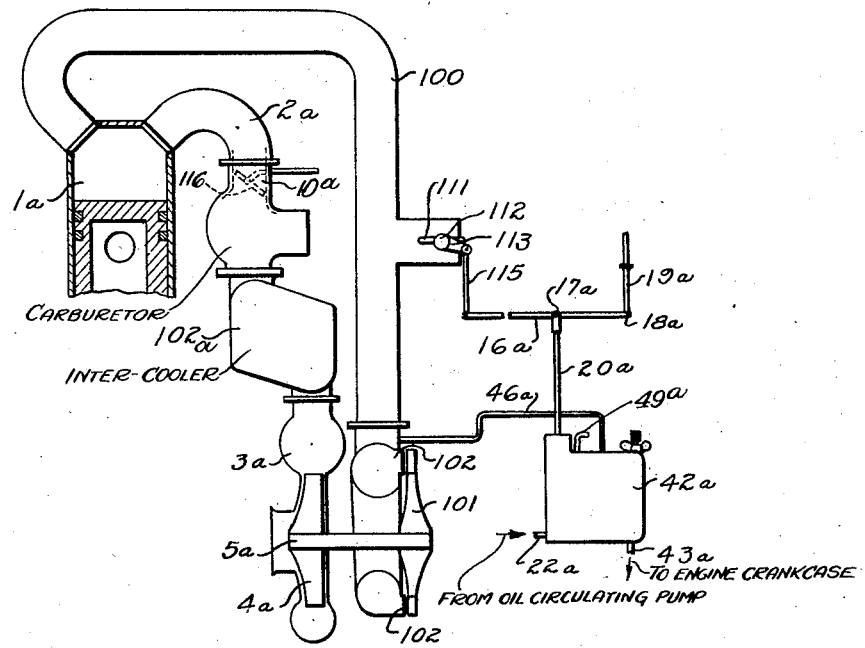
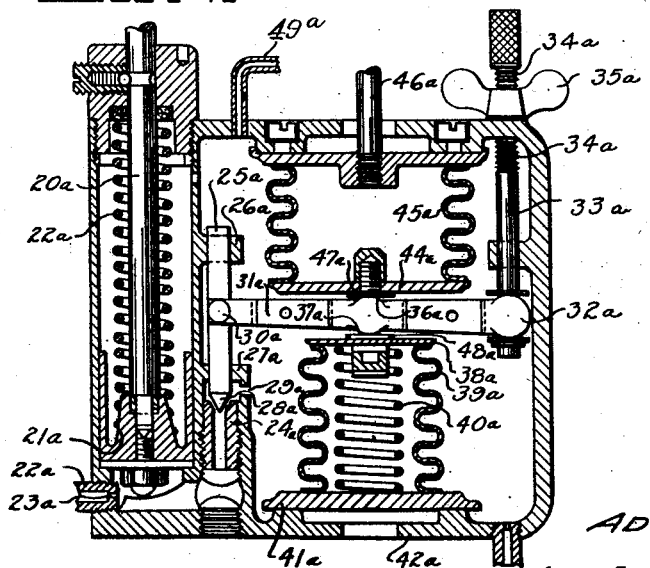

Patented May 19, 1942

2,283,175

UNITED STATES PATENT OFFICE 2,283,175

POWER REGULATOR FOR SUPERCHARGED ENGINES

Adolph L. Berger, Dayton, Ohio

Application May 13, 1940, Serial No. 334,844

13 Claims. (Cl. 60—13)

(Granted under the act of March 3, 1883, as amended April 30, 1928; 370 O. G. 757)

The invention described herein may be manufactured and used by or for the Government for governmental purposes, without the payment to me of any royalty thereon.

This device relates to mechanism for controlling the horsepower output of an engine to maintain the horsepower thereof substantially constant for a given throttle position or operative condition regardless of changes in air density.

In internal combustion engines used in connection with aircraft and provided with superchargers, it is well established that when the intake manifold pressure is maintained substantially constant for a given throttle position, the horsepower of the engine increases with a decrease in air density occasioned by a change in atmospheric condition or an increase in altitude. This increase in horsepower is due to a number of factors, including a reduction in engine exhaust back pressure resulting from better scavenging of the cylinders and a reduction in friction horsepower, comprising piston friction, bearing friction, power required to operate engine auxiliaries, and pumping loss. The pumping loss is the power required to get the combustible charge into, and the products of combustion out of the cylinders, and reduces with a reduction in air density, principally because of the reduced pressure on the exhaust in regions of relatively low air density.

It is an object of this invention to provide mechanism for maintaining such a pressure difference between the intake and exhaust manifolds that the horsepower of the engine will remain substantially constant for a given throttle operation regardless of changes in air density.

It is a further object of this invention to maintain the operation of an engine at a substantially constant power for a given throttle operation under varying air densities, by providing means for reducing the intake manifold pressure with a reduction in air density corresponding substantially to the pressure decrease in the exhaust system.

It is still another object of this invention to provide mechanism responsive to a variation from a pre-established difference between intake manifold pressure and atmosphere pressure for operating the throttle to maintain the pressure difference between the intake and exhaust systems substantially constant for each throttle position.

It is yet another object of this invention to provide, in connection with mechanism for controlling the pressure difference between the intake and exhaust manifolds, force-exerting means responsive to manifold pressure, and opposed force-exerting means responsive to atmospheric pressure, the relative difference between the forces decreasing with decreasing atmospheric pressure up to a given or "critical" pressure, the pressure-controlling mechanism being operatively responsive to the force difference between the two stated forces.

It is another object of this invention to provide, in connection with mechanism for controlling the relative throttle opening, a mechanism for varying the relative throttle opening in a decreasing ratio relationship with increasing altitude.

In the first embodiment of the invention, mechanism is provided in connection with a geared engine-driven supercharger for reducing the intake manifold pressure with increase in altitude to thereby maintain a substantially constant pressure difference between the intake and exhaust systems. The mechanism in accordance with the invention provides servo mechanism operatively responsive to a force difference between an atmospheric-pressure-responsive diaphragm and a diaphragm operatively connected to the intake manifold of the engine.

In the second embodiment of the invention, a mechanism is provided in connection with an exhaust-driven supercharger for controlling the exhaust back pressure to thereby maintain a substantially constant pressure difference between the intake and exhaust manifold pressure for a given throttle position.

In the drawings:

Fig. 1 is a view, partly in elevation and partly in section, of an engine-driven supercharger and mechanism associated with the manifold and throttle to control the manifold pressure.

Fig. 2 is a detailed sectional view of the control mechanism of Fig. 1.

Fig. 3 is a part elevational and part sectional view of an exhaust-driven supercharger and mechanism for controlling the waste gate to vary the pressure in the exhaust manifold.

Fig. 4 is a detailed sectional view of the control mechanism of Fig. 2.

Referring to the first embodiment of the invention, and particularly to Figs. 1 and 2 of the drawings, engine 1 is provided with an intake manifold 2 having operatively associated therewith a supercharger 3. The engine is also provided with a conventional exhaust system (not shown). The supercharger is provided with an impeller 4 mounted on shaft 5 and driven by the engine by means of shaft 8 through gears 6 and 7. To the inlet side of the supercharger is connected an air intake tube 9 carrying a carburetor 10, the throttle valve 11 of which is pivotally mounted at 12. Integral with valve 11 is a lever 13 to which is pivotally connected at 14 a control rod 15 which, in turn, is pivotally connected to lever 16. Lever 16 is carried by plunger rod 20 by being pivotally connected thereto at 17. Also pivotally connected to lever 16 at 18 is a pilot-operated throttle control 19. Connection 17 provides a pivot for lever 16 for operation of the pilot control lever 19. Connection 18 constitutes a point of pivotation for control of the throttle by piston 21, as will be hereinafter more fully explained.

Piston 21 is urged into throttle-opening position by spring 22a and into throttle-closing position by oil from the crankcase of the engine, under pressure of an oil-circulating pump but regulated to exert a predetermined pressure on the piston. Oil is conducted from the crankcase into operative relation with respect to the piston by conduit 22, having a restricted inlet opening 23. The pressure, and consequently the force, exerted on the plunger is controlled by the position of valve 25. The valve is mounted to slide in bearings 26 and 27 and has a tapered portion 28 adapted to be received in a correspondingly tapered portion in valve seat 24. Oil which passes through the valve returns to the crankcase through opening 29, the interior of the control mechanism casing, and tube 43. Tubes 22 and 43 are connected to the crankcase and oil circulating pump in a manner well known in the art and as more particularly illustrated in my prior Patent No. 2,024,202 and in the patent to Gregg, No. 2,088,954.

The position of valve 25 is governed by the differences between the forces exerted by the differentially connected diaphragms 39 and 45. Valve 25 is pivotally connected at 30 to lever 31 which in turn is pivotally mounted at 32 on rod 33. Rod 33 is mounted in suitable bearings in casing 42 and is threaded at 34 so as to be adjustably mounted in the casing. Lock nut 35 holds rod 33 in adjusted position. Lever 31 is received between plate members 38 and 44 of diaphragm members 39 and 45, respectively, and is provided with rounded portions 36 and 37 adapted to engage bearing elements 47 and 48.

Diaphragm member 39 is an evacuated metallic bellows or Sylphon balanced against collapse by means of a spring 40, and adapted to expand and contract in response to variations in atmospheric density. The interior of casing 42 is subjected to changes in atmospheric pressure because it is vented to the atmosphere through tube 43 and the crankcase of the engine which is vented to the atmosphere in the usual manner. Casing 41 may also be suitably vented to the atmosphere by a vent 49.

Bellows or Sylphon 45 is connected by means of tube 46 to manifold 2 at 47 to transmit the intake manifold pressure to member 44 of the bellows 45.

Sylphons 39 and 45 and spring 40 have such preselected characteristics that the difference in the forces exerted by the Sylphons so positions valve 25 as to properly position piston 21 and throttle 11 to furnish a predetermined quantity of air at a given air density while taking into account the engine efficiency at the given air density.

Since Sylphons 39 and 45 are so proportioned as to hold valve 25 open in the inoperative position under a given air density, member 44 is made larger than member 38 by an amount proportional to the change in engine efficiency between the given air density and a "critical" air density. The difference in size between member 38 and 44 is such as to compensate for the increase in engine efficiency resulting from the difference in air density between the given and "critical" densities. In my prior Patent No. 2,024,202, members equivalent to members 38 and 44 are constructed to have the same pressure area, since the manifold pressure is maintained substantially constant and the mechanism for maintaining it substantially constant is responsive to a lack of force equilibration between the two members. In the instant invention, member 44 is made larger than member 38 by an amount which compensates for the increase in efficiency of the engine between a given air density and a "critical" air density. In effect, this amounts to so controlling the throttle as to reduce the horsepower output of the engine at a given air density by an amount equal to the increase in efficiency of the engine resulting from the decrease in air density between the given density and the "critical" density. The increase in efficiency with decrease in air density offsets the effect of the efficiency factor of the throttle control at any given air density up to the "critical" density so as to maintain a constant horsepower.

The operation of this embodiment of the invention is as follows: Manifold pressure transmitted to diaphragm member 45 closes needle valve 25, oil pressure against plunger 21 moving the plunger and the throttle-operating mechanism connected thereto to throttle-closing position. This results in a drop in manifold pressure, tending to open needle valve 25 and, consequently, tending to open the throttle. Since the open diaphragm 45 is made of such a size as to have a pressure area which will result in a greater force on the needle valve in closing direction than exerted by the atmospheric-responsive bellows up to a predetermined "critical" air density, the pressure in the intake manifold is maintained at a value which decreases with decreased air density to maintain a constant horsepower output for any given throttle position and any given air density up to a "critical" density. The "critical" density is that density at which the supercharger has reached its efficient operative limit.

In the second embodiment of the invention the device is applicable to an impeller driven by the engine exhaust gases, and includes servo mechanism responsive to changes in atmospheric density for varying the effective pressure of the exhaust gases applicable for driving the exhaust turbine-driven supercharger.

In this embodiment of the invention the intake manifold pressure is maintained relatively constant for each given throttle position, irrespective of air density up to a "critical" air density, and the exhaust manifold pressure is maintained at a magnitude which will drive the impeller at the requisite speed at each air density and maintain a substantially constant pressure difference between the intake and exhaust manifolds.

Referring to Figure 3 of the drawings: An internal combustion engine, referred to generally as 1a, is provided with an intake manifold 2a and an exhaust manifold 100. Intake manifold 2a has connected thereto in series a carburetor 10a, an inter-cooler 102a, and a supercharger 3a including an impeller 4a carried by shaft 5a. The intake manifold also has associated therewith a conventionally manually controlled throttle 116. Rotation of shaft 5a and impeller 4a is produced by turbine 101 driven by gases from exhaust manifold 100 and directed against impeller 101 by nozzles 102.

The exhaust manifold is provided with a waste gate 111 pivotally mounted at 112 and operated by lever 113, pivotally connected to link 115. Link 115 is pivotally connected to lever 16a pivotally mounted at 17a on plunger rod 20a. A pilot's control 19a is pivotally connected to lever 16a at 18a to enable operation of the waste gate by movement of lever 16a about pivot point 17a. The waste gate is also adapted to be operated by piston 21a through rod 20a, causing pivotation of lever 16a about pivot point 18a. The pressure to operate the piston is supplied by oil from the engine crankcase conducted into operative relation with respect to the piston by conduit 22a and a restricted inlet opening 23a. Valve 25a, slidably mounted in lugs 26a and 27a, controls the pressure exerted by the oil on the piston. Valve 25a, pivotally connected at 30a to lever 31a, controls by its position the pressure on piston 21a. Piston 21a is urged into waste-gate-closing position by oil from the crankcase of the engine under pressure by the oil-circulating pump but regulated to exert a predetermined pressure on the piston. Valve 25a has a tapered portion 28a adapted to be received in a correspondingly tapered portion in valve seat 24a. Oil which passes by valve 25a through opening 29a returns to the crankcase, vented to the atmosphere in the usual manner, by tube 43a. If desired, the interior of casing 42a may be vented to the atmosphere by vent 49a.

Syiphons 39a and 45a have their members 38a and 44a and spring 40a proportioned and constructed similarly to the corresponding parts in Figs. 1 and 2 for the same purpose. The remaining parts function similarly to correspondingly numbered parts in Figs. 1 and 2.

The waste gate is positioned to result in driving the impeller at such a rate as to maintain the effective pressure difference between the intake and exhaust systems substantially constant to maintain a substantially constant horsepower output, irrespective of changes in air density.

The operation of the second embodiment of the invention is as follows: The waste gate is manually closed by the pilot by manipulation of the control. When the engines start up, pressure from the exhaust manifold opens the waste gate by closing valve 25a and a consequent operation of piston 21.

Upon attaining a change in air density, bellows 39a expands opening valve 25a, thus causing retraction of piston 21a and a relative closing of the waste gate. Closing of the waste gate builds up a greater pressure in the exhaust manifold and drives the impeller at a greater speed.

Other objects and advantages of this invention will become apparent from the following description taken in connection with the accompanying drawings, it being clearly understood that the same are by way of illustration and example only and are not to be taken as in any way limiting the spirit or scope of this invention. The spirit and scope of this invention is to be limited only by the terms of the appended claims.

I claim:

1. In an internal combustion engine having an exhaust system, an intake system, and a throttle, a supercharger operatively associated with said intake system for maintaining the air density in said intake system substantially constant for a given throttle setting, and means responsive to pressure changes in said exhaust system for maintaining a substantially constant pressure difference between said two systems for said given throttle setting and for varying atmospheric densities.

2. In an internal combustion engine having an intake system and an exhaust system, a supercharger operatively associated with said intake system, means for controlling the pressure in one of said systems, and means for varying the effect of said pressure-controlling means to maintain a substantially constant pressure difference between intake and exhaust pressures irrespective of varying atmospheric densities, including means responsive to the pressure in one of said systems, and atmospheric-pressure-responsive means, said two pressure-responsive means being differentially connected and in predetermined unbalanced relationship corresponding to the change in engine efficiency as a result of a change in atmospheric pressure.

3. In combination with an internal combustion engine having an intake system and an exhaust system, a supercharger and a throttle operatively associated with said intake system, means for varying the effective operation of said supercharger to maintain a constant horsepower for a given throttle setting regardless of varying air densities comprising means responsive to the pressure in one of said systems and atmospheric-pressure-responsive means, said two responsive means being differentially connected in predetermined unbalanced relation corresponding to the difference in horsepower of the engine between given air densities resulting from the difference in efficiency at the given densities.

4. In combination with an internal combustion engine having an intake system and an exhaust system, a supercharger and a throttle operatively associated with said intake system, means for varying the effective operation of said supercharger to maintain a constant horsepower for a given throttle setting regardless of varying air densities, comprising pressure-responsive piston means for controlling said varying means, valve means for regulating the pressure on said piston means, and means for operating said valve means, including means responsive to the pressure in one of said systems and means responsive to air density, said last two mentioned means being differentially connected in predetermined unbalanced relationship corresponding to the difference in efficiency of the engine at given air densities.

5. In combination with an internal combustion engine having an intake system and an exhaust system, a supercharger operatively associated with said intake system, means for controlling the pressure in one of said systems, and means for varying the effect of said pressure-controlling means in response to a change in the difference between intake and exhaust pressures, including means for exerting a force in response and proportional to the pressure in one of said systems, means for exerting a force in response and proportional to atmospheric pressure, said two force-exerting means being differentially connected and in predetermined unbalanced relationship corresponding to the change in engine efficiency as a result of a change in atmospheric pressure.

6. In combination with an internal combustion engine having an intake system and an exhaust system, a supercharger and a throttle operatively associated with said intake system, means for varying the effective operation of said supercharger to maintain a constant horsepower for a given manual throttle setting regardless of varying air densities, comprising: pressure-responsive piston means for controlling said varying means, valve means for regulating the pressure on said piston means, and means for operating said valve means, including force-exerting means responsive to pressure in one of said systems and force-exerting means responsive to air density, said two force-exerting means being differentially connected and unbalanced by an amount proportional to the decrease in exhaust back pressure between given air densities.

7. In combination with an internal combustion engine having an intake system and an exhaust system, a supercharger and a throttle operatively associated with said intake system, means for varying the supercharging effect to maintain a substantially constant engine horsepower for a given throttle setting regardless of varying air densities, comprising opposed force-exerting means, one of which is responsive to pressure in one of said systems and the other of which is responsive to changes in air density, said opposed force-exerting means being unbalanced to the extent that the horsepower of the engine when operating under a given air density and a given throttle setting, is effectively varied by an amount equal to the variation in horsepower resulting from the change in exhaust back pressure to thereby maintain a constant horsepower.

8. In an internal combustion engine having an intake system and an exhaust system, a supercharger and a throttle operatively associated with said intake system, means for controlling the effective supercharging in response to changes in atmospheric density to maintain a constant engine horsepower for a given throttle setting regardless of air density, comprising means operatively associated with one of said systems for controlling the pressure therein and means for varying the effect of said controlling means to maintain a predetermined relation between intake pressure and exhaust pressure, including: force-exerting means operatively responsive to the pressure changes in one of said systems, force-exerting means operatively responsive to air density changes, said two force-exerting means being unbalanced by an amount proportional to the difference between given air densities, said two force-exerting means being also differentially connected and operatively associated with said supercharging-effect-varying means.

9. In an internal combustion engine having an intake system and an exhaust system, a supercharger and a throttle operatively associated with said intake system, manual positioning means for said throttle, and pressure-responsive means for varying the position of said throttle to compensate for changes in engine efficiency when using air at different air densities, including valve means for controlling said pressure means, and means controlling said valve means, including force-exerting means responsive to pressure in one of said systems and atmospheric-pressure-responsive force-exerting means, said two responsive means being opposed and unbalanced by an amount proportional to the difference between given air densities.

10. In combination with an internal combustion engine having an intake system and an exhaust system, a supercharger operatively associated with said intake system, a throttle, and throttle control means including: intake pressure-responsive means, a pressure reference means which varies in response to changes in atmospheric pressure, said intake pressure-responsive means and pressure reference means being differentially connected in predetermined unbalanced relationship corresponding to engine efficiency at different atmospheric pressures, and means responsive to a pressure difference between said differentially connected means for varying any given throttle control setting to maintain a predetermined pressure difference between intake and outlet pressures for the given throttle setting.

11. In an internal combustion engine having an intake system and an exhaust system, a supercharger operatively associated with said intake system and adapted to be driven by gases from said exhaust system, a waste gate for controlling the pressure of the exhaust gases which operate said supercharger, and means for varying the position of said waste gate to maintain a predetermined relation between intake and exhaust pressures, including exhaust-pressure-responsive means and atmospheric pressure reference means differentially connected in predetermined unbalanced relationship proportional to the change in exhaust back pressure from a given to a "critical" attitude.

12. In combination, an internal combustion engine having an intake system, an exhaust system, and a throttle, a supercharger operatively associated with said intake system and adapted to be driven by gases from said exhaust system, a manually operable waste gate in said exhaust system, and means for varying the manual setting of said waste gate to maintain a substantially constant pressure difference between said intake and exhaust systems irrespective of air density, including force-exerting means responsive to pressure in said exhaust system and force-exerting means responsive to atmospheric pressure, said two force-exerting means being differentially connected in predetermined unbalanced relationship corresponding to the difference between given air densities.

13. In combination, an internal combustion engine having an intake system, an exhaust system, and a throttle, a supercharger operatively associated with said intake system, means for driving said supercharger, a manually operable waste gate in said exhaust system, and means for varying the manual setting of said waste gate to maintain a substantially constant pressure difference between said intake and exhaust systems irrespective of air density, including force-exerting means responsive to pressure in said exhaust system and force-exerting means responsive to atmospheric pressure, said two force-exerting means being differentially connected in predetermined unbalanced relationship corresponding to the difference between given air densities.

ADOLPH L. BERGER.